(12) United States Patent
Takatsuka et al.

(10) Patent No.: US 7,262,374 B2
(45) Date of Patent: Aug. 28, 2007

(54) POINTING DEVICE AND KEY SHEET FOR POINTING DEVICE

(75) Inventors: Toshinori Takatsuka, Fuji (JP);
Yoshifumi Honmatsu, Tokyo (JP);
Masami Arai, Tokyo (JP)

(73) Assignees: Asahi Kasei EMD Corp., Tokyo (JP);
Polymatech Co. Ltd., Tokyo (JP)

( * ) Notice: Subject to any disclaimer, the term of this patent is extended or adjusted under 35 U.S.C. 154(b) by 0 days.

(21) Appl. No.: 11/455,638

(22) Filed: Jun. 20, 2006

(65) Prior Publication Data
US 2006/0284710 A1 Dec. 21, 2006

(30) Foreign Application Priority Data
Jun. 21, 2005 (JP) .............................. 2005-180340

(51) Int. Cl.
*H01H 9/30* (2006.01)
(52) U.S. Cl. .............................. 200/5 A; 200/61.45 M; 200/512; 335/205; 345/160
(58) Field of Classification Search ................ 200/5 A, 200/512–513, 520, 341, 61.45 M; 335/192, 335/205–207; 345/156–160
See application file for complete search history.

(56) References Cited

U.S. PATENT DOCUMENTS

| | | | | |
|---|---|---|---|---|
| 5,504,502 A | * | 4/1996 | Arita et al. ................. | 345/160 |
| 6,593,735 B2 | * | 7/2003 | Becker ................... | 324/207.26 |
| 6,677,843 B1 | * | 1/2004 | Monroe et al. ............. | 335/205 |
| 6,864,679 B2 | * | 3/2005 | Yokoji et al. .......... | 324/207.11 |
| 2005/0059858 A1 | * | 3/2005 | Frith et al. .................. | 600/118 |
| 2005/0264530 A1 | * | 12/2005 | Takatsuka et al. .......... | 345/160 |

FOREIGN PATENT DOCUMENTS

| | | |
|---|---|---|
| JP | 2000-235822 | 8/2000 |
| JP | 2002-150904 A1 | 5/2002 |
| JP | 2004-062447 A1 | 2/2004 |

* cited by examiner

*Primary Examiner*—K. Richard Lee
(74) *Attorney, Agent, or Firm*—Rader, Fishman & Grauer PLLC

(57) ABSTRACT

Provided are a pointing device allowing accurate depressing operation on a key top and involving no erroneous input or erroneous operation, and a key sheet for the pointing device. On the back surface of a base sheet (14) of a key sheet (15) for a pointing device, an accommodating portion (17) for a magnet (13), for accommodating portion greatly protrudes toward a board (P) beyond a pusher (14b) is provided. When the key top (12) is depressed, the accommodating portion (17) and the magnet (13) come into contact with the board (P), and causes the depressed key top (12) to tilt using the point of contact as a fulcrum, thereby pressing the pusher (14b) against a contact switch (Pi, Po). Thus, it is possible to reduce the thickness and weight of the pointing device (10) and the key sheet (15) for the pointing device. Further, a reduction is achieved in terms of the possibility of erroneous input and erroneous operation, making it possible to reliably effect confirmation input.

18 Claims, 5 Drawing Sheets

POINTING DEVICE AND KEY SHEET FOR POINTING DEVICE

BACKGROUND OF THE INVENTION

1. Field of the Invention

The present invention relates to a pointing device to be used as an operating device of an electronic apparatus, such as a mobile phone, a PDA, or a game controller, and to a key sheet to be used in the pointing device, in particular, a magnetism detection type pointing device which detects a change in magnetic flux density through lateral movement operation of a key top to determine a lateral position of the key top and which also functions as a key capable of performing confirmation input through key top depressing operation, and to a key sheet for the pointing device.

2. Description of the Related Art

Operating devices for electronic apparatuses and the input systems for them are being diversified. In this context, there is known a magnetism detection type pointing device which detects with a magnetic sensor a change in magnetic flux density due to "lateral movement" of a magnet through, for example, tilting of a key top, and which utilizes this change as a lateral position input signal. Above all, a pointing device which also functions as a key capable of confirmation input through key top depressing operation is used as an input key of a mobile phone, etc., and is disclosed, for example, in JP 2004-62447 A. As shown in FIG. 10, in such a pointing device, a magnet is embedded and retained in a key top to be operated.

In a magnetism detection type pointing device (1) as shown in FIG. 10, a magnet (2) is inside a key top (3), so the distance between the magnet (2) and magnetic sensors (4) is rather large. Thus, to attain a sufficient sensitivity property, it is necessary for the magnet (2) to be large or for the magnetic force to be strong. An attempt to meet this demand results in an increase in the thickness of the key top (3), an increase in the weight of the pointing device (1), etc. Further, when a magnet with strong magnetic force is used, there is a fear of the magnetic force being leaked to the exterior to adversely affect peripheral devices, a magnetic card, etc.

Further, the key top (3) is used to effect directional input (lateral position input) through lateral movement operation and confirmation input through depression of a contact belleville spring (Po) on a board (P) by depressing the key top in a direction substantially perpendicular to the lateral movement direction to thereby bring a board contact (Pi) into conduction, so that it is necessary for the key top (3) to be capable of moving vertically and horizontally. However, a large movable range for the key top (3) and a high degree of freedom in movement thereof can lead to an increase in the looseness of the key top (3) at the time of operation, making it rather difficult to effect accurate depressing operation. When the depressing operation is not properly effected on the key top (3), erroneous input or erroneous operation results.

SUMMARY OF THE INVENTION

The present invention may provide a pointing device of the type which is capable of effecting directional input and confirmation input, wherein it is possible to attain a reduction in thickness and weight. The present invention may also provide a pointing device, which does not easily involve erroneous input and erroneous operation at the time of confirmation input.

Described herein is a key sheet for a pointing device, including: a key top; a base sheet formed of a rubber-like elastic material, having, on a back surface of the base sheet opposed to a board, a protrusion-like pusher opposed to a contact switch provided on the board, and having the key top on a front surface of the base sheet on the side opposite to the back surface; and a magnet provided on the base sheet, the pusher being displaced toward the board through a depressing operation of the key top to depress the contact switch provided on the board, the magnet being laterally moved through elastic deformation of the base sheet as a result of a lateral moving operation of the key top to cause a change in magnetic flux density with respect to a magnetic sensor provided on the board, in which an accommodating portion for the magnet for accommodating portion greatly protrudes toward the board beyond the pusher is provided on the back surface of the base sheet, and characterized in that the accommodating portion comes into contact with the board when the key top is depressed and causes the key top depressed to tilt using the point of contact as a fulcrum to thereby press the pusher against the contact switch.

In accordance with the present invention, there is further provided a pointing device equipped with a key sheet and a board having a contact switch and a magnetic sensor; the key sheet has a key top, a protrusion-like pusher opposed to the contact switch and provided on a back surface opposed to a board, a base sheet having the key top on a front surface thereof on the side opposite to the back surface and composed of a rubber-like elastic member, and a magnet provided on the base sheet; when the key top is depressed, the pusher effects depression input through the contact switch, and when the key top is laterally moved, the magnet moves laterally while causing elastic deformation of the base sheet, with the magnetic sensor detecting a change in magnetic flux density due to the lateral movement; there is provided on the back surface of the base sheet a magnet accommodating portion greatly protruding toward the board beyond the pusher; and the accommodating portion comes into contact with the board when the key top is depressed, tilting the depressed key top using the point of contact as a fulcrum to press the pusher against the contact switch.

The key top may be provided on the front surface of the base sheet, and the magnet accommodating portion greatly protruding toward the board beyond the pusher is provided on the back surface of the base sheet opposed to the board, with the magnet being provided in the accommodating portion, so it is possible to place the magnet near the board, making it possible to use a magnet of a weaker magnetic force and smaller size than in the prior art. It is thus possible to provide a key sheet for a pointing device and a pointing device in which it is possible to achieve a reduction in magnetic flux leakage, and a reduction in thickness and weight.

Further, at the time of depression of the key top, the magnet accommodating portion may come into contact with the board, and the depressed key top is tilted using the point of contact as the fulcrum, so it is possible to reliably effect confirmation input through the depression of the key top, and to reduce the risk of erroneous input and erroneous operation.

The accommodating portion may come into contact with the board when the key top is depressed. When the depressing operation is not performed, the accommodating portion may be in or out of contact with the board. In the case in which the accommodating portion is in contact with the board, the key top can be tilted using the point of contact as the fulcrum every time the key top is depressed, so it is possible for the pusher to be reliably pressed against the contact switch. When the key top is laterally moved, the point of contact may slide on the board. Further, the pusher may prevent excessive depression at the time of lateral movement of the key top, so a stable operation is possible. In contrast, in the case in which the accommodating portion is out of contact with the board, the accommodating portion is not brought into contact with the board at the time of lateral movement, so a smooth lateral movement operation is possible.

Further, the present invention provides a key sheet for a pointing device, including: a key top; a base sheet formed of a rubber-like elastic material having, on a back surface of the base sheet opposed to a board, a protrusion-like pusher opposed to a contact switch provided on the board, and having the key top on a front surface of the base sheet on the side opposite to the back surface; and a magnet provided on the base sheet, the pusher being displaced toward the board through a depressing operation of the key top to depress the contact switch provided on the board, the magnet being laterally moved through elastic deformation of the base sheet as a result of a lateral moving operation of the key top to cause a change in magnetic flux density with respect to a magnetic sensor provided on the board, in which an accommodating portion for the magnet for accommodating portion retains the magnet while greatly protruding toward the board beyond the pusher is provided on the back surface of the base sheet, and characterized in that the magnet comes into contact with the board when the key top is depressed and causes the key top depressed to tilt using the point of contact as a fulcrum to thereby press the pusher against the contact switch.

Still further, the present invention provides a pointing device equipped with a key sheet, and a board having a contact switch and a magnetic sensor, the key sheet, including: a key top; a base sheet formed of a rubber-like elastic material having, on a back surface of the base sheet opposed to a board, a protrusion-like pusher opposed to a contact switch provided on the board, and having the key top on a front surface of the base sheet on the side opposite to the back surface; and a magnet provided on the base sheet, the pusher effecting depression input on the contact switch upon a depressing operation of the key top, the magnet being laterally moved through elastic deformation of the base sheet as a result of a lateral moving operation of the key top, a magnetic sensor detecting a change in magnetic flux density as a result of the lateral movement, in which an accommodating portion for the magnet for accommodating portion retains the magnet while protruding greatly toward the board beyond the pusher is provided on the back surface of the base sheet, and characterized in that the magnet comes into contact with the board when the key top is depressed and causes the key top depressed to tilt using the point of contact as a fulcrum to thereby press the pusher against the contact switch.

Also in these aspects of the present invention, the key top is provided on the front surface of the base sheet, and the magnet accommodating portion is provided on the back surface of the base sheet opposed to the board, with the accommodating portion retaining the magnet so as to protrude greatly toward the board beyond the pusher, so it is possible to place the magnet near the board, making it possible to use a magnet of a weaker magnetic force and smaller size than in the prior art. It is thus possible to provide a key sheet for a pointing device and a pointing device in which it is possible to achieve a reduction in magnetic flux leakage, thickness, and weight.

Further, when the key top is depressed, the magnet may come into contact with the board, and tilt the depressed key top using the point of contact as the fulcrum to press the pusher against the contact switch, so it is possible to reliably perform confirmation input through the depression of the key top and to reduce the risk of erroneous input and erroneous operation.

The magnet may come into contact with the board when the key top is depressed. As with the accommodating portion, when the depressing operation is not performed, the magnet may be in or out of contact with the board. Assuming that the magnet is in contact with the board, the key top can be tilted using the point of contact on the board as the fulcrum every time the key top is depressed, so it is possible to reliably press the pusher against the contact switch. When the key top is laterally moved, the point of contact can slide on the board. Further, the pusher may prevent excessive depression at the time of lateral movement of the key top, so a stable operation is possible. In contrast, assuming that the magnet is out of contact with the board, the magnet does not come into contact with the board at the time of lateral movement, so smooth lateral movement is possible.

Regarding the arrangement of the accommodating portion and the pusher, the accommodating portion and the pusher are provided such that both of them at least partially overlap the key top in the depressing direction of the key top. Since both the accommodating portion and the pusher are provided such that both of them at least partially overlap the key top in the direction in which the key top is depressed, at least a part of each of the accommodating portion and the pusher exists in the direction in which the key top is depressed. Thus, the depressing force applied to the key top can be transmitted to both the accommodating portion and the pusher. The forward end of the accommodating portion protrudes beyond the forward end of the pusher, so, when depressing operation is performed on the key top, the accommodating portion or the magnet in contact with the board serves as the fulcrum, and the key top can be tilted in the normal tilting direction, making it possible to accurately bring the contact switch into conduction by means of the pusher.

In the present invention, the accommodating portion and the pusher may be provided symmetrically with respect to the center of the key top. Since the accommodating portion and the pusher are situated symmetrically with respect to the center of the key top, the accommodating portion and the magnet greatly protruding toward the board beyond the pusher are brought into contact with the board through the depression of the key top, and it is possible for the pusher to reliably effect input on the contact switch, with the accommodating portion or the magnet serving as the tilting fulcrum for the key top.

Further, in these aspects of the present invention, it is also possible to provide a plurality of the pushers, and to provide the accommodating portion at the center of the key top, with the pushers being provided radially around the accommodating portion. Since the accommodating portion is provided at the center of the key top, and a plurality of pushers are provided radially around the accommodating portion, it is possible for the key top to be tilted in a number directions using the accommodating portion at the center of the key top as the tilting fulcrum, with the plurality of pushers being pressed against a plurality of contact switches provided on the board, so it is possible to effect multi-directional input.

In the pointing device of the present invention, it is possible to provide the magnetic sensor on the back surface of the board not opposed to the key sheet. When the magnetic sensor is provided on the back surface of the board not opposed to the key sheet, there is no fear of the magnetic sensor coming into contact with the magnet or the pusher as in the case in which the magnetic sensor is provided on the front surface of the board, so it is possible to achieve an increase in the degree of freedom in designing the size and position of the magnet.

In the key sheet for a pointing device and the pointing device of the present invention, it is possible to effect both lateral position determination and confirmation input, and to achieve a reduction in thickness and weight, with erroneous operation or erroneous input not being easily involved at the time of confirmation input. Thus, the present invention is particularly applicable to a portable apparatus of which a compact design is required and in which no upside or downside is fixed.

The contents of the present invention are not restricted to the above-described constructions. The advantages, features, and uses of this invention will become more apparent from the following description given with reference to the accompanying drawings. Further, it should be understood that all appropriate modifications not departing from the gist of this invention are covered by the scope of this invention.

DESCRIPTION OF THE PREFERRED EMBODIMENTS

Figure 1:
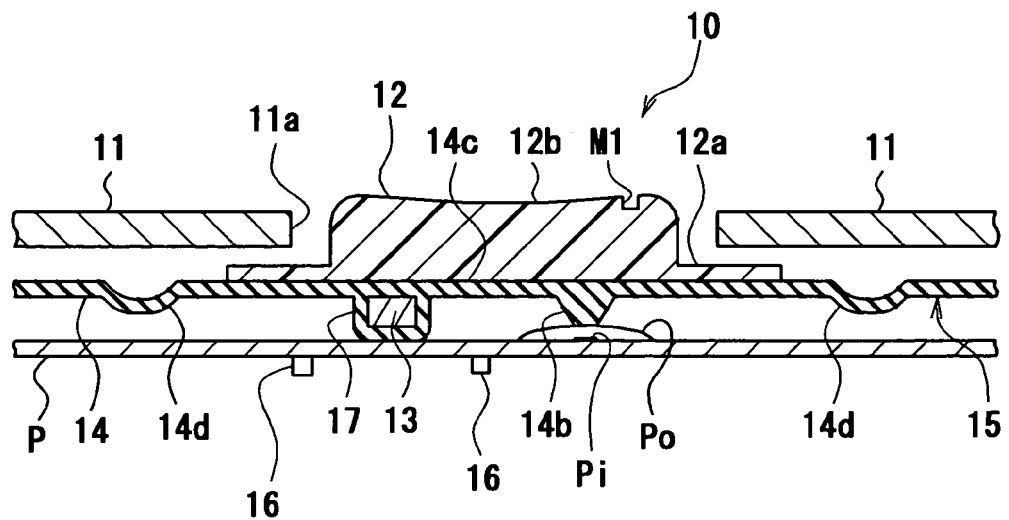
FIG. 1 is a sectional view, taken along the line I-I of FIG. 2, of a pointing device according to a first embodiment of the present invention.

In the following, embodiments of the present invention will be described with reference to the drawings. In the drawings, the reference numerals indicate portions and components. In the description of the embodiments, an abundant description of the materials and structures common to those of the previously described embodiment will be omitted.

Figure 2:
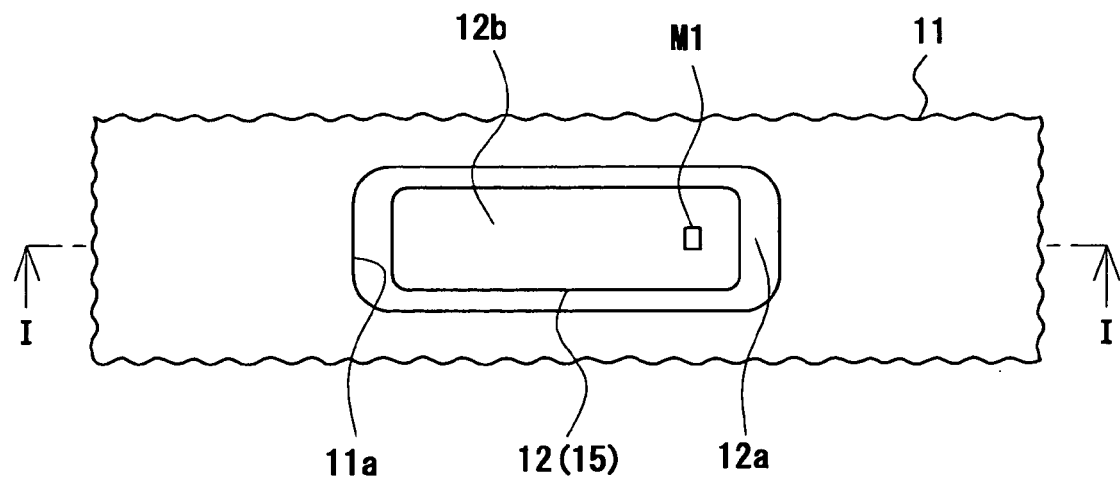
FIG. 2 is a plan view of the pointing device of the first embodiment as mounted on an electronic apparatus.
Figure 3:
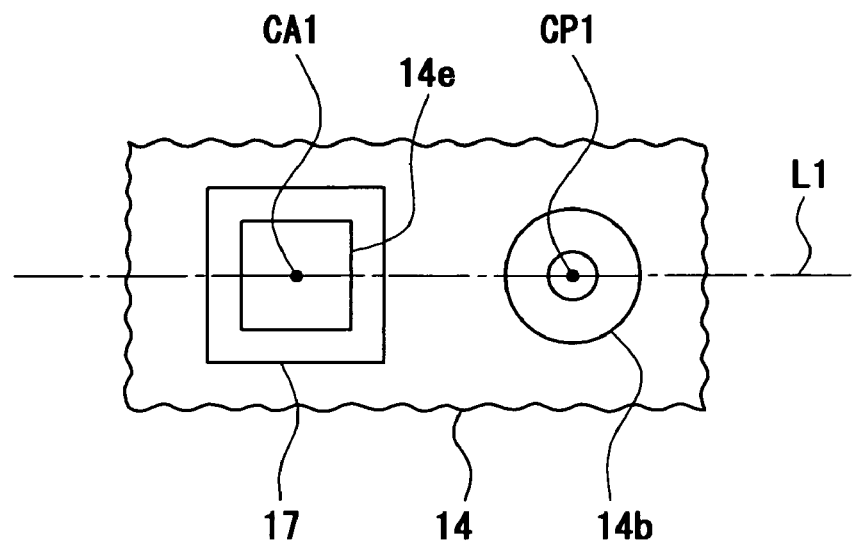
FIG. 3 is an enlarged bottom view of a pusher and an accommodating portion in a base sheet of the pointing device of the first embodiment.

First Embodiment {FIGS. 1 through 4}: as shown in FIGS. 1 and 2, in a pointing device (10) according to this embodiment, opposed to a board (P) provided with magnetic sensors (16) is a key sheet (15) having a key top (12) exposed through the surface of a casing (11) of an electronic apparatus. The electronic apparatus can be a mobile phone, a personal digital assistant (PDA), a game controller, a car navigation apparatus, or a car audio apparatus. Moreover, the electronic apparatus can be operated with a finger. Also shown is a base sheet (14) to which the key top (12) is firmly attached and which retains a magnet (13) so as to allow it to make lateral movement. At the ends (not shown) of the key sheet (15), the key sheet (15) is held between the casing (11) and the board (P). Thus, the interior of the electronic apparatus is isolated from the exterior by the base sheet (14). By isolating the interior of the electronic apparatus from the exterior, the intrusion of foreign matter, such as dust or water, into the electronic apparatus can be prevented.

The key top (12) may be configured from a hard resin. This hard resin may include an elastomer resin, a polycarbonate resin, or an ABS resin. Likewise, the key top (12) may be configured from metal or the like. The configuration of the key top (12) may be in conformity with various designs, such as a substantially cylindrical configuration or a substantially parallelepiped-like configuration. In addition, the configuration of the key top (12) can include indicia such as characters, or various decorations provided on the front surface or the back surface of the key top (12). In the example shown, a mark (M1) is provided on the front surface of the key top (12), indicating a depressing position for effecting confirmation input. Further, in the lower portion of the side surface of the key top (12), there is formed, as a portion of the key top (12), a flange (12a) extending along the back surface of the casing (11), serving as a mask for the base sheet (14) and as a structure contributing to detachment prevention of the key top (12). The key top (12) and the base sheet (14) can be firmly attached to each other chemically by means of an adhesive, fusion bonding, etc. or mechanically by means of clips, screws, etc.

The key top (12) can be firmly attached to the front surface of the base sheet (14). The base sheet (14) may be formed of a rubber-like elastic material. This rubber-like elastic material may be silicone rubber or styrene-type thermoplastic elastomer. An accommodating portion (17) and a pusher (14b) are formed on the back surface of the base sheet (14), which is opposed to the board (P). Further, the base sheet (14) may have, in the outer periphery of a key top placing portion (14c) firmly attached to the key top (12), bellows portions (14d). The bellows portions (14d) are adapted to expand and contract as the key top (12) is laterally moved. The accommodating portion (17), in which the magnet (13) is retained by a rubber-like elastic material, greatly protrudes from the back surface of the base sheet (14) toward the board (P) beyond the pusher (14b). The accommodating portion (17) and the pusher (14b) are situated off the center of the key top (12) and symmetrically with respect to the center of the key top (12). Further, both the accommodating portion (17) and the pusher (14b) are provided so as to overlap the key top (12) at least partially in the direction in which the key top (12) is depressed.

Figure 4:
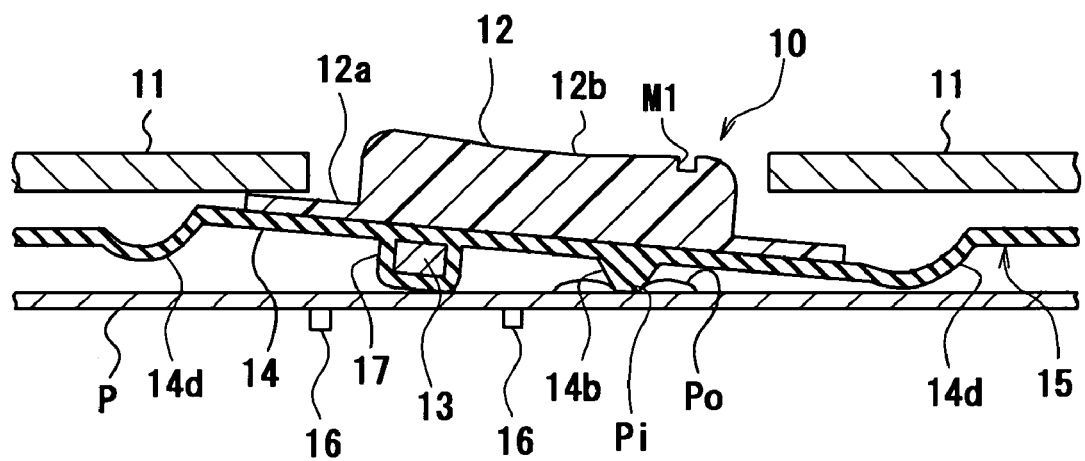
FIG. 4 is a sectional view of the pointing device of FIG. 1 as depressed.

The portions constituting the base sheet (14) will be described. First, the pusher (14b) is a portion to be pressed against a contact belleville spring (Po) provided on the board (P) to bring a board contact (Pi) into conduction. In other words, the pusher (14b) is a portion of the base sheet (14) that is adapted to depress a contact switch. This contact switch may consist of the contact belleville spring (Po) and the board contact (Pi). As shown in FIG. 4, the pusher (14b) may cause a part of the base sheet (14) to protrude. It is also possible for the pusher (14b) to be formed as a separate member. This separate member may be composed of a hard resin. Moreover, the forward end of a convex portion of pusher (14b) being covered with a film of small coefficient of friction is also within the scope of the invention. In particular, the forward end portion of the pusher (14b), which is held in contact with the contact belleville spring (Po), may be formed in a configuration and of a material of small coefficient of friction so as not to interfere with the sliding operation.

The accommodating portion (17) is a portion for retaining the magnet (13) on the key sheet (15), and is provided on the back surface of the base sheet (14). To reliably obtain a tactile feel at the time of depression, the accommodating portion (17) may be arranged on the inner side of the key top (12) as a whole including the flange (12a). In this embodiment, the accommodating portion (17) is arranged at a position off the center of the key top (12). By depressing the key top (12), it is possible to accurately depress the single board contact (Pi). While no particular limitations regarding the mode in which the magnet of the accommodating portion (17) is retained, as shown in FIG. 1, by injecting the base sheet material two times to surround the entire surface of the magnet (13), it is advantageously hard for the magnet (13) to be detached from the key sheet (15). In order that the sliding operation of the key top (12) may not be impaired by friction, a layer of a configuration and a material of small coefficient of friction may be provided on the portion of the accommodating portion (17) which is to be brought in contact with the board (P).

The accommodating portion (17) may be in or out of contact with the board (P). Even in the case in which accommodating portion (17) is out of contact with the board (P), it may be necessary for the bottom surface of the accommodating portion (17) to be brought into contact with the board (P) before the board contact (Pi) is brought into conduction at the time of depression of the key top (12), so the forward end of the accommodating portion (17) protrudes beyond the forward end of the pusher (14b). Further, there are no particular limitations either regarding the configuration of the bottom surface of the accommodating portion (17); the bottom surface may be of a configuration not easily generating friction with the board (P). Further, as shown, for example, in FIG. 3, in order to reliably effect confirmation input, the bottom surface of the accommodating portion (17) may be configured so as to have an end portion (14e) crossing, substantially in a perpendicular manner a phantom line projected onto the board (P) and connecting the center (CA1) of the accommodating portion (17) and the center (CP1) of the pusher (14b).

The bellows portion (14d) may be a portion adapted to expand and contract at the time of lateral movement and depression of the key top (12) to allow lateral movement and depressing movement of the key top (12). For this purpose, the bellows portion (14d) can be configured so to as to have a pleated fold. Likewise, the bellows portion (14d) can be configured as a combination of thick-walled and thin-walled portions. These configurations may effect the expansion and contraction of the base sheet (14). The expansion and contraction of the base sheet (14) may allow for the lateral movement and depressing movement of the key top (12).

The magnet (13) retained by the accommodating portion (17) may be selected from various types of magnet. These types of magnet may include, but is not limited to, an Alnico magnet, a ferrite magnet, a Sm—Co magnet, a neodymium magnet, or a plastic magnet formed by filling powder of these magnets with resin, or the like.

To be utilized for the magnetic sensors (16) provided on the board (P) are Hall elements, Hall ICs, magnetoresistive effect elements, magnetoresistive effect ICs, etc. To attain the requisite magnetic flux density, the magnet (13) and the magnetic sensors (16) are appropriately selected and combined for use.

Next, the operation and effects of the pointing device (10) will be described.

The key top (12) may be capable of moving to the right and left directions of the plane as seen in FIG. 2 within the range of the diameter of a penetration hole (11a) formed in the casing (11). The key top (12) may allow depressing operation through the plane of FIG. 2 toward the board (P).

That is, the bellows portions (14d) provided in the base sheet (14) can expand and contract with the lateral movement of the key top (12), so that when the key top (12) is moved, for example, laterally to the right, the portion of the bellows portion (14d) which is approached by the key top (12) is deformed so as to be bent, and the portion of the bellows portion (14d) from which the key top (12) departs is deformed so as to expand, whereby the key top (12) supported by the key top placing portion (14c) is allowed to move laterally. The force with which the laterally moved key top (12) is restored to the initial position is mainly provided by the bellows portions (14d).

On the other hand, as shown in FIG. 4, when depressing operation is performed on the key top (12) in the direction perpendicular to the lateral direction, the accommodating portion (17) may be held in contact with the board (P) to constitute a fulcrum, and the pusher (14b) may cause the contact belleville spring (Po) to buckle, whereby a tactile feel can be generated, and the board contact (Pi) brought into conduction. In this process, even if a position off the mark (M1) indicating the depressing operation position for the key top (12) is depressed, the key top (12) is tilted, with the accommodating portion (17) being held in contact with the board (P) to serve as a fulcrum, so that confirmation input is effected accurately. In particular, in this embodiment, the bottom surface of the accommodating portion (17) has the end portion (14e), so that if, for example, a longitudinal side surface of the key top (12) in FIG. 2 is depressed, i.e., off the center of the key top, the depression is effected so as to cause the key top (12) to be tilted in the correct tilting direction due to the end portion (14e).

In this way, the key top (12) can be tilted through lateral movement and depression. When the key top (12) is moved laterally, the magnet (13) is moved laterally together with the key top (12), whereby the distance between the magnet (13) and the magnetic sensors (16) is changed. The magnetic sensors (16) read a change in magnetic flux density due to this change in distance, so it is possible to sense the position in the horizontal direction. Further, through depression of the key top (12), the contact belleville spring (Po) and the board contact (Pi) are brought into conduction, making it possible to effect switch input, such as confirmation input.

In the pointing device (10), the magnet (13) is not accommodated in the key top (12) but is accommodated in the accommodating portion (17) provided on the other side surface of the base sheet (14), so that it is possible to reduce the distance between the magnet (13) and the magnetic sensors (16), and to reduce the thickness of the key top (12). Further, it is possible to perform depressing operation on the key top (12) in which the key top (12) is tilted using the accommodating portion (17) as the fulcrum. In particular, the accommodating portion (17) may be at a position off the center of the key top (12), and the pusher (14b) and the accommodating portion (17) may be on the opposite sides with respect to the key top center, so that it is possible to effect confirmation input accurately no matter which portion of the key top (12) may be depressed.

Figure 5:
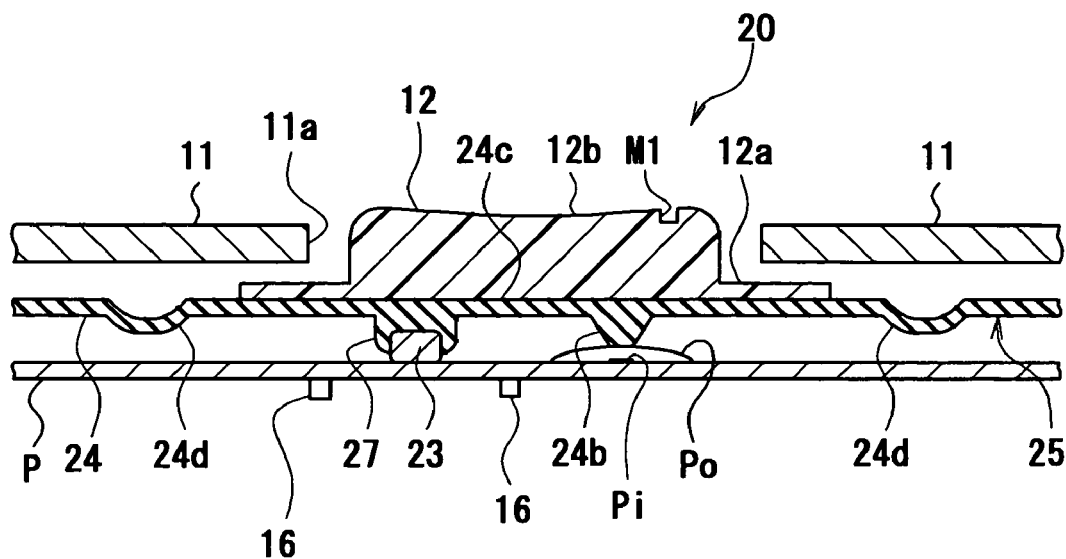
FIG. 5 is a sectional view, corresponding to FIG. 1, of a pointing device according to a second embodiment.

Second Embodiment {FIG. 5}: FIG. 5 shows a pointing device (20) according to the second embodiment of the present invention. In contrast to the pointing device (10) of the first embodiment, in the pointing device (20), the configuration of an accommodating portion (27) provided on a base sheet (24) is changed. That is, a part of a magnet (23) is exposed, and the magnet (23) protrudes from the forward end of the accommodating portion (27). Since a part of the magnet (23) is exposed, the mounting of the magnet (23) can be easy to perform. Further, the coefficient of friction of the magnet (23) is smaller than that of the rubber-like elastic material, so that the frictional resistance offered by the board (P) is advantageously less. Further, it is possible to make the distance between the magnet (23) and the magnetic sensors (16) smaller. The retention of the magnet (23) may be effected by bonding the magnet (23) to the interior of the accommodating portion (27).

In the pointing device (20) also, it is possible to perform depressing operation on the key top (12) using the accommodating portion (27) as the fulcrum, and it is possible to effect accurate confirmation input no matter what portion of the key top (12) may be depressed.

The base sheet (24), the pusher (24b), the key top placing portion (24c), the bellows portions (24d), and the key sheet (25) of the second embodiment respectively correspond to the base sheet (14), the pusher (14b), the key top placing portion (14c), the bellows portions (14d), and the key sheet (15) of the first embodiment.

Figure 6:
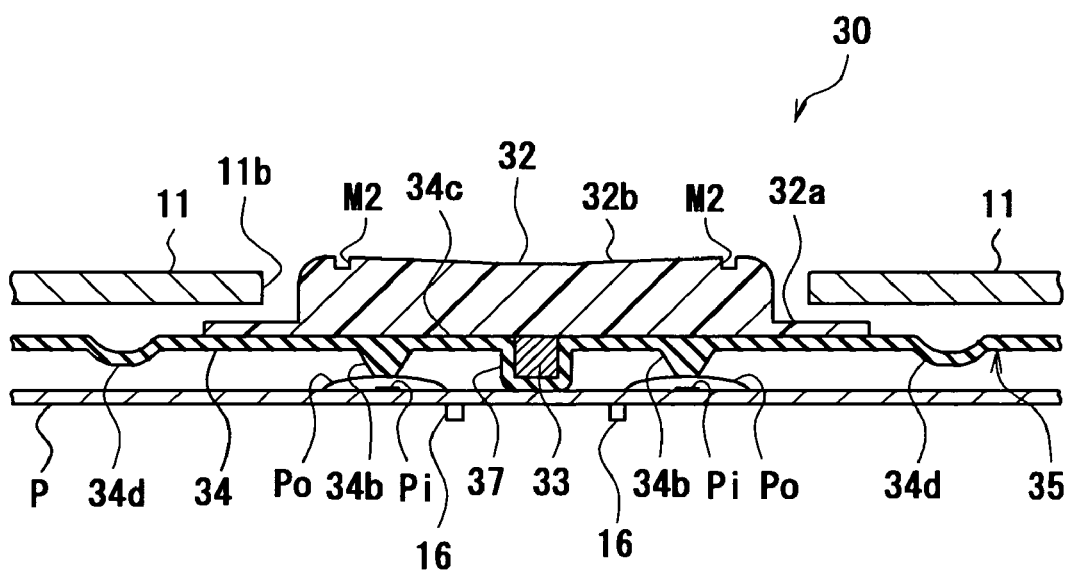
FIG. 6 is a sectional view, taken along the line VI-VI of FIG. 7, of a pointing device according to a third embodiment.
Figure 7:
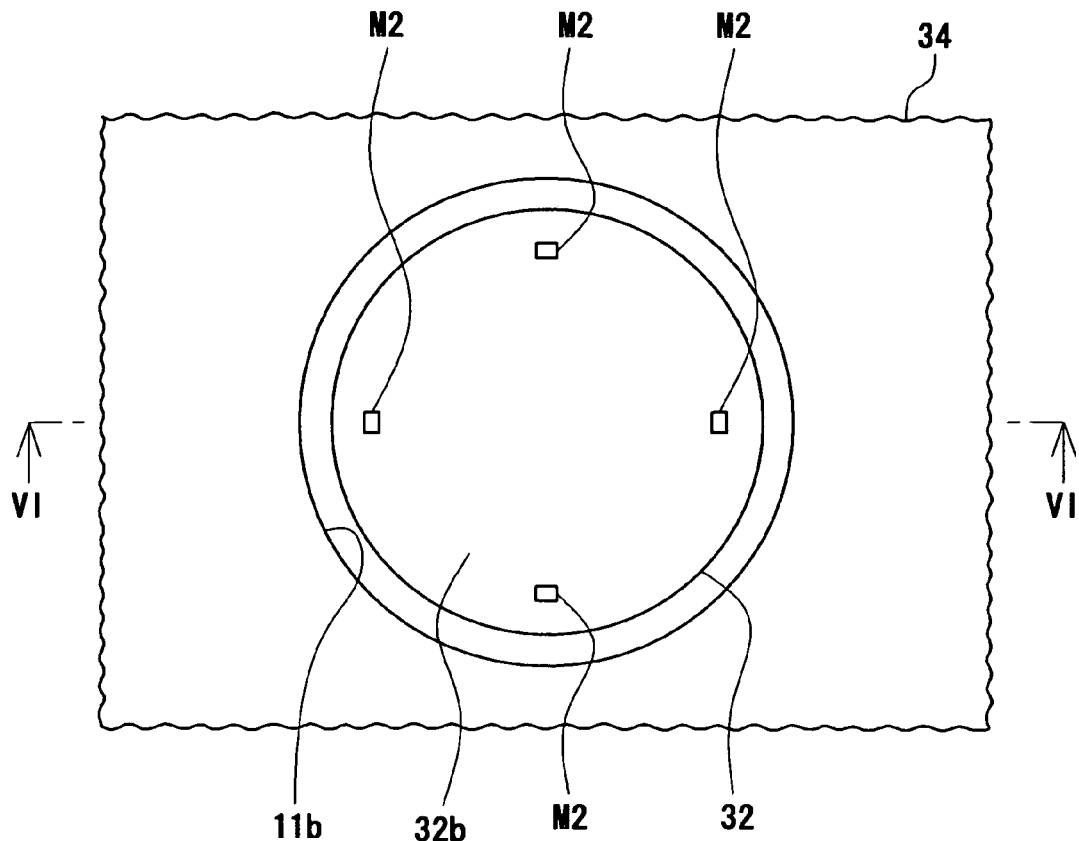
FIG. 7 is a plan view of the pointing device of the third embodiment as mounted on an electronic apparatus.
Figure 8:
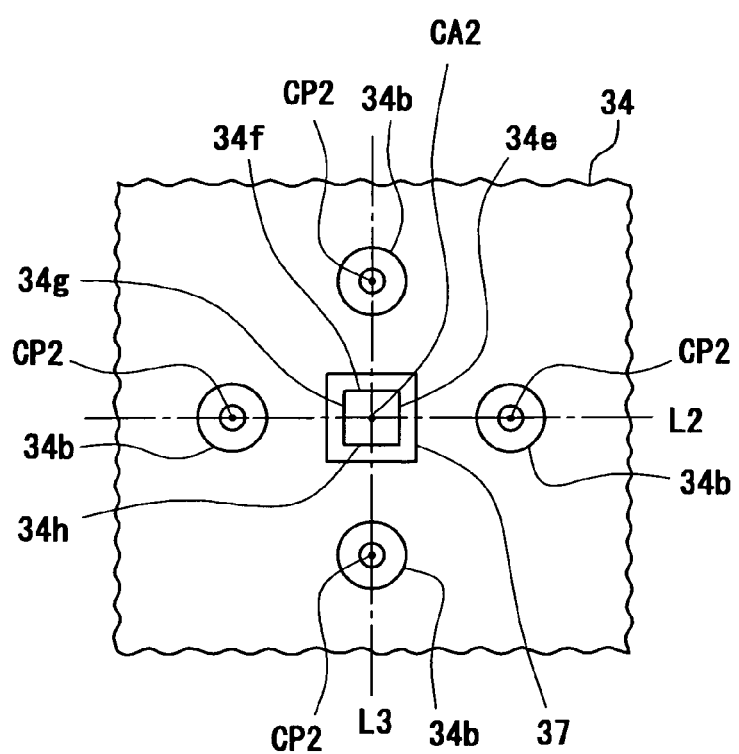
FIG. 8 is an enlarged bottom view of a pusher and an accommodating portion in a base sheet of the pointing device of the third embodiment.

Third Embodiment {FIGS. 6 through 8}: FIGS. 6 through 8 show the third embodiment of the present invention. In a pointing device (30) according to this embodiment, an accommodating portion (37) may be provided such that the projected position of the accommodating portion (37) on a depressing operation surface (32b) of a key top (32) can be at the center of the depressing operation surface (32b). And, four pushers (34b) may be provided at equal intervals in the circumference of the same circle whose center is the accommodating portion (37). In other words, the accommodating portion (37) can be provided at the center of the key top (32), and four pushers (34b) may be arranged radially around the accommodating portion (37). And, the key top (32) can be moved laterally by 360 degrees from the center toward the outer periphery, allowing lateral position input by 360 degrees. Further, four marks (M2) indicating the depressing positions for the key top (30) are provided in the depressing operation surface (32b). By performing depressing operation at the four marks (M2), four independent confirmation inputs are possible.

FIG. 8 shows a vertical phantom line (L1) connecting the center (CA2) of the accommodating portion (37) and the centers of (CP2) of the vertically arranged pushers (34b) as projected on the board (P) and a horizontal phantom line (L2) connecting the center (CA2) of the accommodating portion (37) and the centers of (CP2) of the horizontally arranged pushers (34b) as projected on the board (P). As shown in the drawing, the accommodating portion (37) has, at its bottom, end portions (34f, 34h) extending so as to cross the phantom line (L1) substantially in a perpendicular manner and end portions (34e, 34g) extending so as to cross the phantom line (L2) substantially in a perpendicular manner. Thus, no matter what portion of the key top (32) may be depressed, the board contact (Pi) closest to the depressing position is accurately brought into conduction. In the case in which the accommodating portion (37) is in contact with the board (P), it slides on the board (P) when the key top (32) is moved laterally, and involves no excessive depression of the key top (32), thus securing stable lateral movement.

The base sheet (34), the key top placing portion (34c), the bellows portions (34d), and the key sheet (35) of the third embodiment respectively correspond to the base sheet (14), the key top placing portion (14c), the bellows portions (14d), and the key sheet (15) of the first embodiment.

Figure 9:
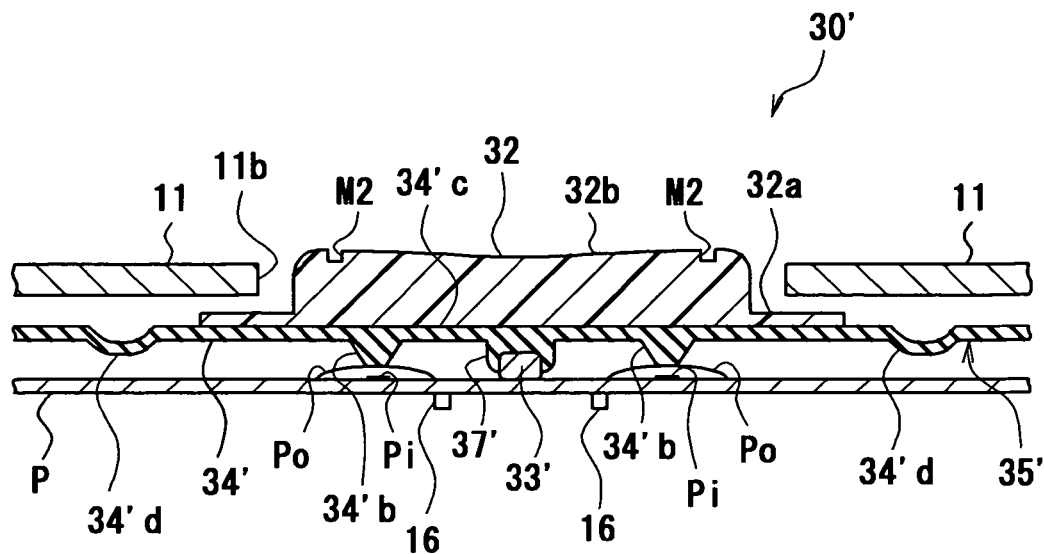
FIG. 9 is a sectional view, corresponding to FIG. 1, of a pointing device according to a modification of the third embodiment.
Figure 10:
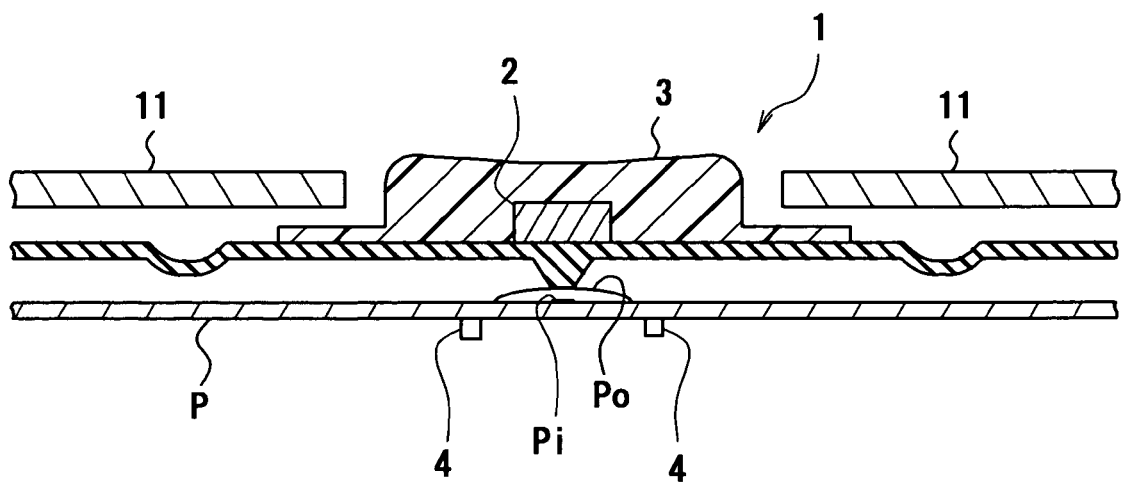
FIG. 10 is a sectional view of a conventional pointing device.

Modification of the Third Embodiment {FIG. 9}: FIG. 9 shows a modification of the third embodiment. In contrast to the pointing device (30) of the third embodiment, in a pointing device (30') according to this modification, the configuration of the accommodating portion (37') provided on the base sheet (34') is changed. That is, a part of the magnet (33') is exposed and protrudes from the forward end of the accommodating portion (37'). As in the second embodiment, a part of the magnet (33') is exposed, so that, the mounting of the magnet (33') is facilitated, the frictional resistance respect to the board (P) can be reduced, and the distance between the magnet (33') and the magnetic sensors (16) can be further diminished. The retention of the magnet (33') may be effected by bonding the magnet (33') to the interior of the accommodating portion (37').

The base sheet (34') the pusher (34'b), the key top placing portion (34'c), the bellows portions (34'd), and the key sheet (35') of the modification of the third embodiment respectively correspond to the base sheet (34), the pusher (34b), the key top placing portion (34c), the bellows portions (34d), and the key sheet (35) of the third embodiment.

Modifications of the Embodiments: the first through third embodiments described above further allow the following modifications.

While in the above embodiments the key top (12, 32) and the base sheet (14, 24, 34) are formed as separate components, it is also possible for the key top (12, 32) to be formed of a protrusion provided through modification of the configuration of the base sheet (14, 24, 34). That is, the key top (12, 32) may constitute a part of the base sheet (14, 24, 34).

It is also possible to provide an internal light source, such as a light-emitting diode (LED), on the board (P) to form the key top (12, 32) as a so-called illumination type key top, in which illumination can be effected through the key top (12, 32).

While the magnetic sensors (16) can be provided on the back surface of the board (P), it is also possible for the magnetic sensors (16) to be provided on the front surface of the board (P) insofar as the magnetic sensors (16) do not interfere with the lateral movement and depression movement of the key top (12, 32).

While confirmation input is possible at one position in the first embodiment and at four positions in the third embodiment, it is also possible to provide a pointing device in which confirmation input is possible at two positions symmetrical with respect to the accommodating portion.

The description of the present invention should not be construed restrictively; advantages, features, and uses of the present invention will become still more apparent from the following description given with reference to the accompanying drawings. Further, it should be understood that all appropriate modifications made without departing from the gist of the present invention are covered by the scope of the present invention. While various embodiments of the present invention are described, it should be understood that they have been presented by way of example only, and not as a limitation. Thus, the breadth and scope of the present invention should not be limited by any of the above-described exemplary embodiments.

What is claimed is:

1. A key sheet for a pointing device, comprising:
   a key top;

a base sheet formed of a rubber-like elastic material having, on a back surface of the base sheet opposed to a board, a protrusion-like pusher opposed to a contact switch provided on the board, and having the key top on a front surface of the base sheet on the side opposite to the back surface; and a magnet provided on the base sheet, the pusher being displaced toward the board through a depressing operation of the key top to depress the contact switch provided on the board, the magnet being laterally moved through elastic deformation of the base sheet as a result of a lateral moving operation of the key top to cause a change in magnetic flux density with respect to a magnetic sensor provided on the board, wherein an accommodating portion for the magnet for accommodating portion greatly protrudes toward the board beyond the pusher is provided on the back surface of the base sheet, and wherein the accommodating portion comes into contact with the board when the key top is depressed and causes the key top depressed to tilt using the point of contact as a fulcrum to thereby press the pusher against the contact switch.

2. A key sheet for a pointing device according to claim 1, wherein both the accommodating portion and the pusher are situated so that the accommodating portion and the pusher at least partially overlap the key top in the direction of the key top being depressed.

3. A key sheet for a pointing device according to claim 1, wherein the accommodating portion and the pusher are arranged at positions symmetrical with respect to the center of the key top.

4. A key sheet for a pointing device according to claim 1, wherein a plurality of the pushers are provided, wherein the accommodating portion is provided at the center of the key top, and wherein the pushers are provided radially around the accommodating portion.

5. A key sheet for a pointing device, comprising:
a key top;
a base sheet formed of a rubber-like elastic material having, on a back surface of the base sheet opposed to a board, a protrusion-like pusher opposed to a contact switch provided on the board, and having the key top on a front surface of the base sheet on the side opposite to the back surface; and
a magnet provided on the base sheet,
the pusher being displaced toward the board through a depressing operation of the key top to depress the contact switch provided on the board,
the magnet being laterally moved through elastic deformation of the base sheet as a result of a lateral moving operation of the key top to cause a change in magnetic flux density with respect to a magnetic sensor provided on the board,
wherein an accommodating portion for the magnet for accommodating portion retains the magnet while greatly protruding toward the board beyond the pusher is provided on the back surface of the base sheet, and
wherein the magnet comes into contact with the board when the key top is depressed and causes the key top depressed to tilt using the point of contact as a fulcrum to thereby press the pusher against the contact switch.

6. A key sheet for a pointing device according to claim 5, wherein both the accommodating portion and the pusher are situated so that the accommodating portion and the pusher at least partially overlap the key top in the direction of the key top being depressed.

7. A key sheet for a pointing device according to claim 5, wherein the accommodating portion and the pusher are arranged at positions symmetrical with respect to the center of the key top.

8. A key sheet for a pointing device according to claim 5, wherein a plurality of the pushers are provided, wherein the accommodating portion is provided at the center of the key top, and wherein the pushers are provided radially around the accommodating portion.

9. A pointing device equipped with a key sheet, and a board having a contact switch and a magnetic sensor,
the key sheet, comprising:
a key top;
a base sheet formed of a rubber-like elastic material having, on a back surface of the base sheet opposed to a board, a protrusion-like pusher opposed to a contact switch provided on the board, and having the key top on a front surface of the base sheet on the side opposite to the back surface; and
a magnet provided on the base sheet,
the pusher effecting depression input on the contact switch upon a depressing operation of the key top,
the magnet being laterally moved through elastic deformation of the base sheet as a result of a lateral moving operation of the key top, at least one of the magnetic sensor detecting a change in magnetic flux density as a result of the lateral movement,
wherein an accommodating portion for the magnet for accommodating portion greatly protrudes toward the board beyond the pusher is provided on the back surface of the base sheet, and
wherein the accommodating portion comes into contact with the board when the key top is depressed and causes the key top depressed to tilt using the point of contact as a fulcrum to thereby press the pusher against the contact switch.

10. A pointing device according to claim 9, wherein both the accommodating portion and the pusher are situated so that the accommodating portion and the pusher at least partially overlap the key top in the direction of the key top being depressed.

11. A pointing device according to claim 9, wherein the accommodating portion and the pusher are arranged at positions symmetrical with respect to the center of the key top.

12. A pointing device according to claim 9, wherein a plurality of the pushers are provided, wherein the accommodating portion is provided at the center of the key top, and wherein the pushers are provided radially around the accommodating portion.

13. A pointing device according to claim 9, wherein the magnetic sensor is provided on the back surface of the board not opposed to the key sheet.

14. A pointing device equipped with a key sheet, and a board having a contact switch and a magnetic sensor,
the key sheet comprising:
a key top;
a base sheet formed of a rubber-like elastic material having, on a back surface of the base sheet opposed to a board, a protrusion-like pusher opposed to a contact switch provided on the board, and having the key top on a front surface of the base sheet on the side opposite to the back surface; and
a magnet provided on the base sheet, the pusher effecting depression input on the contact switch upon a depressing operation of the key top, the magnet being laterally moved through elastic deformation of the base sheet as a result of a lateral moving operation of the key top, at least one of the magnetic sensor detecting a change in magnetic flux density as a result of the lateral movement, wherein an accommodating portion for the magnet for accommodating portion retains the magnet while protruding greatly toward the board beyond the pusher is provided on the back surface of the base sheet, and wherein the magnet comes into contact with the board when the key top is depressed and causes the key top depressed to tilt using the point of contact as a fulcrum to thereby press the pusher against the contact switch.

15. A pointing device according to claim 14, wherein both the accommodating portion and the pusher are situated so that the accommodating portion and the pusher at least partially overlap the key top in the direction of the key top being depressed.

16. A pointing device according to claim 14, wherein the accommodating portion and the pusher are arranged at positions symmetrical with respect to the center of the key top.

17. A pointing device according to claim 14, wherein a plurality of the pushers are provided, wherein the accommodating portion is provided at the center of the key top, and wherein the pushers are provided radially around the accommodating portion.

18. A pointing device according to claim 14, wherein the magnetic sensor is provided on the back surface of the board not opposed to the key sheet.

* * * * *

UNITED STATES PATENT AND TRADEMARK OFFICE
CERTIFICATE OF CORRECTION

PATENT NO.         : 7,262,374 B2
APPLICATION NO. : 11/455638
DATED              : August 28, 2007
INVENTOR(S)        : Toshinori Takatsuka et al.

It is certified that error appears in the above-identified patent and that said Letters Patent is hereby corrected as shown below:

Title page,
Item [73], Assignees

Please make the following correction:

"Asahi Kasel EMD Corp., Tokyo (JP)" should be --Asahi Kasei EMD Corp., Tokyo (JP) --

Signed and Sealed this

Twentieth Day of November, 2007

JON W. DUDAS
*Director of the United States Patent and Trademark Office*